United States Patent
Uchida (10) Patent No.: US 8,470,391 B2
(45) Date of Patent: Jun. 25, 2013

(54) MAGNETIC RECORDING MEDIA (75) Inventor: Shinji Uchida, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 13/221,329

(22) Filed: Aug. 30, 2011

(65) Prior Publication Data
US 2011/0311840 A1  Dec. 22, 2011

Related U.S. Application Data (62) Division of application No. 12/268,083, filed on Nov. 10, 2008, now Pat. No. 8,034,413.

(30) Foreign Application Priority Data

Nov. 9, 2007 (JP) .................... 2007-292346

(51) Int. Cl.
*G11B 5/667* (2006.01)

(52) U.S. Cl.
USPC .......................................... 427/128; 427/129

(58) Field of Classification Search
USPC .. 427/127, 128, 129, 130, 131, 132; 428/836, 428/836.1, 836.2, 836.3
See application file for complete search history.

(56) References Cited

U.S. PATENT DOCUMENTS

| | | | |
|---|---|---|---|
| 5,679,473 A | 10/1997 | Murayama et al. | |
| 6,727,010 B2 | 4/2004 | Hanawa et al. | |
| 6,852,431 B2 | 2/2005 | Fukutani et al. | |
| 7,586,830 B2 | 9/2009 | Yasui et al. | |
| 7,625,645 B2 | 12/2009 | Kikitsu et al. | |
| 2003/0219631 A1* | 11/2003 | Takahashi et al. ............ 428/695 | |
| 2004/0048108 A1 | 3/2004 | Umada et al. | |
| 2004/0057343 A1 | 3/2004 | Murakami et al. | |
| 2004/0101713 A1* | 5/2004 | Wachenschwanz et al. .. 428/694 SG | |
| 2005/0263915 A1 | 12/2005 | Fujita et al. | |

(Continued)

FOREIGN PATENT DOCUMENTS

| | | |
|---|---|---|
| JP | 56-119934 A | 9/1981 |
| JP | 58-118028 A | 7/1983 |

(Continued)

OTHER PUBLICATIONS

Japanese Office Action of corresponding JP 2007-292346, dated Sep. 16, 2011 (JP 2006-286158 cited in the office action was previously cited in an IDS filed Aug. 30, 2011).

(Continued)

*Primary Examiner* — Michael Cleveland
*Assistant Examiner* — Tabassom Tadayyon Eslami
(74) *Attorney, Agent, or Firm* — Rossi, Kimms & McDowell LLP (57) ABSTRACT

A method for manufacturing discrete track media and patterned media is disclosed which enables a magnetic recording layer having excellent magnetic characteristics to be obtained without imparting damage to a crystal orientation control layer which is at the surface when forming the magnetic recording layer. The method for manufacturing magnetic recording media comprises a process of forming a soft magnetic layer on a substrate; a process of forming a first crystal orientation control layer on the soft magnetic layer; a process of providing a depression in at least a portion of the first crystal orientation control layer; a process of performing heat treatment of the first crystal orientation control layer; and a process of forming a magnetic recording layer on the first crystal orientation control layer.

12 Claims, 4 Drawing Sheets

U.S. PATENT DOCUMENTS

| | | | |
|---|---|---|---|
| 2006/0093863 A1 | 5/2006 | Tsuchiya et al. |
| 2006/0183004 A1 | 8/2006 | Hattori et al. |
| 2006/0222905 A1 | 10/2006 | Yasui et al. |
| 2006/0269791 A1 | 11/2006 | Okawa et al. |
| 2006/0286345 A1 | 12/2006 | Nakao |
| 2006/0292400 A1 | 12/2006 | Suwa et al. |
| 2008/0118780 A1 | 5/2008 | Kato |
| 2008/0218906 A1 | 9/2008 | Uchida |
| 2009/0002878 A1 | 1/2009 | Oka |
| 2009/0123781 A1 | 5/2009 | Uchida |

FOREIGN PATENT DOCUMENTS

| | | |
|---|---|---|
| JP | 1-158617 A | 6/1989 |
| JP | 4-310621 A | 11/1992 |
| JP | 5-81640 A | 4/1993 |
| JP | 2513746 B2 | 4/1996 |
| JP | 08-115519 A | 5/1996 |
| JP | 2003-16622 A | 1/2003 |
| JP | 2003-123239 A | 4/2003 |
| JP | 2003-178431 A | 6/2003 |
| JP | 2003-242623 A | 8/2003 |
| JP | 2004-227639 A | 8/2004 |
| JP | 2006-12285 A | 1/2006 |
| JP | 2006-127681 A | 5/2006 |
| JP | 2006-277950 A | 10/2006 |
| JP | 2006-286158 A | 10/2006 |
| JP | 2007-200395 A | 8/2007 |
| JP | 2008-090999 A | 4/2008 |
| JP | 2008-217908 A | 9/2008 |

OTHER PUBLICATIONS

Oikawa et al.; High Performance CoPtCrO Single Layered Perpendicular Media with No Recording Demagnetization; IEEE Transactions on Magnetics; vol. 36, No. 5; Sep. 2000; pp. 2393-2395.

Specification and drawings of U.S. Appl. No. 12/268,047, filed Nov. 10, 2008; "Method for Manufacturing Magnetic Recording"; Shinji Uchida; Specification and pp. 1-22; drawings 1-3.

Notification of Reasons of Refusal issued in corresponding JP Appln 2007-054546, dated Oct. 15, 2010. Partial English translation provided.

Chemical Properties Handbook, 1999, McGraw-Hill, p. 1 (Au).
Chemical Properties Handbook, 1999, McGraw-Hill, p. 1 (Pd).
Chemical Properties Handbook, 1999, McGraw-Hill, p. 1 (Pt).
Handbook of Materials Selection, 2002, John Willey & Sons, Inc. New York, 302-303.
Proc. SPIE. "Fine gold grating fabrication on glass plate by imprint lithography", vol. 5220, 74, Online Publication Date Oct. 30, 2003.

\* cited by examiner

MAGNETIC RECORDING MEDIA

CROSS REFERENCE TO RELATED APPLICATION

This application is a divisional of U.S. patent application Ser. No. 12/268,083, filed Nov. 10, 2008 now U.S. Pat. No. 8,034,413, the entire content of which is herein incorporated by reference.

BACKGROUND OF THE INVENTION

A. Field of the Invention

This invention relates to a method for manufacturing magnetic recording media. More specifically, this invention relates to a method for manufacturing perpendicular magnetic recording media. Still more specifically, this invention relates to a method for manufacturing discrete track media or patterned media which have satisfactory electromagnetic conversion characteristics at high recording densities and excellent productivity.

B. Description of the Related Art

Magnetic recording devices are one type of information recording device supporting the information-oriented society of recent years. As the volume of information has increased, ever-higher recording densities for the magnetic recording media used in magnetic recording devices have been demanded. In order to realize higher recording densities, the units in which magnetization reversals occur must be made smaller. To this end, it is important that the sizes of magnetic grains be reduced while simultaneously clearly separating the units of magnetization reversal (recording units), so as to weaken magnetic interaction between adjacent recording units.

As technology to realize higher recording densities, perpendicular magnetic recording methods are being studied in place of conventional longitudinal magnetic recording methods. At present, CoCr system alloy crystalline films, having a hexagonal close-packed (hcp) structure, with crystal orientation controlled such that the c axis is perpendicular to the film plane (that is, the c plane is parallel to the film plane), are primarily being studied as materials of the magnetic recording layers used in media for perpendicular magnetic recording methods. Further, in order to accommodate further increases in recording density, finer crystal grains in such CoCr system alloy crystalline films, narrowing of grain diameter distributions (reduction of the variation in crystal grain size), weakening of the magnetic interaction between grains, and other issues are being studied.

The use of what is generally called a granular magnetic layer, which is a magnetic recording layer having a structure in which magnetic crystal grains are surrounded by a nonmagnetic nonmetallic material such as an oxide or nitride, is being studied as one method to further raise recording densities. In a granular magnetic layer, the grain boundary phase, formed by the nonmagnetic nonmetal material, physically separates the magnetic crystal grains, so that magnetic interaction between magnetic crystal grains is reduced. This suppresses the formation of zigzag domain walls arising in recording unit transition regions, and low noise characteristics are obtained. For example, a perpendicular magnetic recording medium has been proposed in which a magnetic recording layer of a CoPtCrO alloy with a granular structure is layered upon an Ru underlayer (see IEEE Trans., Mag., Vol. 36, 2393 (2000)). In this perpendicular magnetic recording media, as the thickness of the Ru layer which is the underlayer is increased, the c-axis orientation of the magnetic recording layer with a granular structure is enhanced. In other words, as the thickness of the Ru layer is increased, perpendicular magnetic recording media having excellent magnetic characteristics and electromagnetic conversion characteristics are obtained. Also, the use of RF sputtering deposition employing a CoNiPt target to which $SiO_2$ or other oxides are added has been reported to produce a magnetic recording layer with a granular structure in which individual magnetic crystal grains are surrounded and separated by nonmagnetic oxides, so that magnetic recording media with low noise can be obtained (see U.S. Pat. No. 5,679,473).

Further, the provision of a crystal orientation control layer directly below a granular-structure magnetic recording layer, using a material having an hcp crystal structure similar to that of the magnetic recording layer material, has been proposed (see Japanese Patent Laid-open No. 2003-123239 and Japanese Patent Laid-open No. 2003-242623). In this configuration, Co grains grow in the magnetic recording layer at positions corresponding to crystalline regions (crystal grains) in the crystal orientation control layer, and oxides in the magnetic recording layer precipitate and grow at positions corresponding to crystal grain boundaries, porous regions, or amorphous regions in the crystal orientation control layer. In other words, the magnetic crystal grains in the magnetic recording layer grow epitaxially on crystal grains in the crystal orientation control layer, and by this means the crystal orientation of the crystal orientation control layer is reflected in the crystal orientation of the magnetic recording layer. Simultaneously, amorphous-phase crystal grain boundaries are formed on the periphery of the magnetic crystal grains in the magnetic recording layer. In this way, the crystal state in a granular-structure magnetic recording layer can be controlled.

Perpendicular magnetic recording media having comparatively good magnetic characteristics and electromagnetic conversion characteristics are obtained by using a granular-structure magnetic recording layer. However, the granular-structure magnetic recording layers in perpendicular magnetic recording media of the prior art have been continuous films (so-called full-coverage films). In order to further raise the recording densities of perpendicular magnetic recording media, it is necessary to prevent write bleeding in adjacent recording tracks, reduce the formation of zigzag domain walls due to randomly-positioned grains, alleviate the effect of thermal fluctuations due to reduced crystal grain sizes, and decrease the magnetic interaction between magnetic crystal grains.

Related to the need for the above improvements, discrete track media and patterned media have been proposed. Discrete track media are perpendicular magnetic recording media in which the magnetic recording layer is formed from a plurality of magnetic member strips, which are completely separated magnetically. By using the plurality of magnetic member strips as recording tracks, boundaries between adjacent recording tracks are artificially formed, and magnetization reversal units are clearly demarcated. In discrete track media, the above-described write bleeding to adjacent recording tracks, as well as the formation of zigzag domain walls due to randomly placed grains can be prevented. On the other hand, patterned media is an ultimate form of perpendicular magnetic recording media in which the magnetic recording layer is formed by artificially arranging the shapes and sizes of a plurality of "islands" forming unit magnetic domains, with each of these "islands" being used as a single magnetization reversal unit (recording unit or bit).

Various methods have been proposed for the manufacture of discrete track media and patterned media. For example, a method has been proposed in which etching is used to physically separate the magnetic recording layer (see Japanese Patent Laid-open No. 4-310621). As a modification of this method, a method has been proposed in which etching is used to remove a portion of the magnetic recording layer and the crystal orientation control layer there below, and pack the removed portions with a nonmagnetic material, to form a magnetic recording layer comprising a plurality of magnetically independent portions (see Japanese Patent Laid-open No. 2006-12285). Also, a method has been proposed in which etching is used to form depressions in the substrate surface which are filled with a magnetic recording layer (see Japanese Patent Laid-open No. 56-119934). A further method has been proposed in which a portion of a soft magnetic layer formed on a substrate is removed, and magnetic material is layered thereupon, to form a magnetic recording layer comprising a plurality of magnetically independent portions (see Japanese Patent Laid-open No. 1-158617). Finally, a method has been proposed in which a portion of a soft magnetic layer and a portion of a crystal orientation control layer formed on a substrate are removed, and magnetic material is layered thereupon, to form a magnetic recording layer comprising a plurality of magnetically independent portions (see Japanese Patent Laid-open No. 2003-16622).

As stated above, in methods of manufacture of discrete track media and patterned media proposed in the past, portions of either the magnetic recording layer, or the magnetic recording layer and crystal orientation control layer, or the substrate, or the soft magnetic layer, or the soft magnetic layer and crystal orientation layer, are intentionally removed, to form a magnetic recording layer comprising a plurality of magnetically independent portions (see Japanese Patent Laid-open No. 4-310621, Japanese Patent Laid-open No. 2006-12285, Japanese Patent Laid-open No. 56-119934, Japanese Patent Laid-open No. 1-158617, and Japanese Patent Laid-open No. 2003-16622).

However, when removing portions of the magnetic recording layer, or of the magnetic recording layer and crystal orientation control layer, direct etching of the magnetic recording layer itself is entailed. Consequently the magnetic characteristics of the magnetic recording media are degraded due to damage to the magnetic recording layer caused by etching, corrosion of the magnetic recording layer due to remnant components of the etchant, and other causes. Furthermore, when removing portions of the substrate, it is difficult to form a magnetic recording layer having satisfactory crystal orientation and perpendicular anisotropy in the minute depressions (grooves). Hence satisfactory magnetic characteristics for the magnetic recording media cannot be expected.

Moreover, when removing portions of the soft magnetic layer, or of the soft magnetic layer and the crystal orientation layer, a planarization process of packing nonmagnetic material into the depression thus formed and of using chemical-mechanical polishing (CMP) or similar to smooth the surface is necessary. This is because, when large depressions and protrusions exist in the surface, the magnetic head flying stability declines. However, it is difficult to pack, uniformly and without gaps, a minute depression which has a high aspect ratio (ratio of the opening dimension to the depth dimension). In particular, when the aspect ratio (ratio of the opening dimension to the depth dimension) is high and the depression is minute, there is the possibility that depressions and protrusions in the surface after packing may be increased, depending on the depressions/protrusions prior to packing. For this reason, even when CMP is applied to the surface after packing, obtaining a completely smooth surface is difficult. Also, the amount of polishing is increased, and there is the possibility that film thickness can no longer be controlled.

Hence there remains a demand relating to manufacturing methods for discrete track media and patterned media comprising a plurality of magnetically independent portions which do not give rise to the above-described problems. In particular, there is a demand relating to manufacturing methods for discrete track media and patterned media, enabling a magnetic recording layer having excellent magnetic characteristics to be obtained without imparting damage to the crystal orientation control layer which is at the surface when forming the magnetic recording layer.

The present invention is directed to overcoming or at least reducing the effects of one or more of the problems set forth above.

SUMMARY OF THE INVENTION

In order to resolve the above problems, a method for manufacturing perpendicular magnetic recording media of this invention is characterized in having: (a) a process of forming a soft magnetic layer on a substrate; (b) a process of forming a first crystal orientation control layer on the soft magnetic layer; (c) a process of providing a depression in at least a portion of the first crystal orientation control layer; (d) a process of performing heat treatment of the first crystal orientation control layer; and (e) a process of forming a magnetic recording layer on the first crystal orientation control layer. A modified example of a method for manufacturing perpendicular magnetic recording media of this invention is characterized in further having, between the above processes (d) and (e), a process (d2) of forming a second crystal orientation control layer on the first crystal orientation control layer, and moreover is characterized in that in process (e), the magnetic recording layer is formed in contact with the second crystal orientation control layer.

Discrete track media and patterned media can be manufactured by a simple method by adopting the above-described configuration, without causing degradation of the magnetic characteristics of the magnetic recording layer during manufacture as compared with previous methods of manufacture of discrete track media and patterned media proposed. Further, in a manufacturing method of this invention, the heights of protrusions necessary to obtain magnetically separate tracks or bits are not as high as those required in methods proposed in the prior art. Hence a manufacturing method of this invention does not require a planarization process itself, and at the same time magnetic recording media with excellent head flying performance can be provided. Further, even when a planarization process is performed as necessary, by making the heights of protrusions small, productivity in the planarization process can be improved.

BRIEF DESCRIPTION OF THE DRAWINGS

The foregoing advantages and features of the invention will become apparent upon reference to the following detailed description and the accompanying drawings, of which:

FIG. 3 shows magnetic characteristics of the magnetic recording layer in the media of Embodiment 1, Comparative Examples 1 and 2, and Reference Example 1, in which

DETAILED DESCRIPTION OF SPECIFIC EMBODIMENTS

Below, aspects of the invention are explained. FIG. 1 is used to explain a perpendicular magnetic recording media manufacturing method of this invention. FIGS. 1A to 1F explain principal process steps in the method of the invention. The perpendicular magnetic recording media obtained by this method of the invention comprises, at least, on substrate 10 which is a nonmagnetic base, soft magnetic layer 20, a crystal orientation control layer comprising first crystal orientation control layer 31 and second crystal orientation control layer 32, and magnetic recording layer 40 comprising granular-structure portion 41 and nongranular-structure portion 42.

Substrate 10 used in this invention can be formed using an Al alloy plated with NiP, reinforced glass, or crystallized glass, such as are normally used in magnetic recording media.

The first process step (a) of this method of the invention is a process of forming soft magnetic layer 20 on substrate 10. Soft magnetic layer 20 is a layer which concentrates magnetic flux generated by the magnetic head, to form a sharp magnetic field gradient in the magnetic recording layer 40. Soft magnetic layer 20 can be formed using a sputtering method to layer an NiFe system alloy, Sendust (FeSiAl) alloy, or amorphous Co alloy (for example, CoNbZr, CoTaZr, or similar). In particular, in light of the ability to obtain satisfactory electromagnetic conversion characteristics, it is desirable that an amorphous Co alloy be used. Further, the optimum value of the thickness of soft magnetic layer 20 depends on the structure and characteristics of the magnetic head used in magnetic recording. However, from the standpoint of productivity, it is desirable that soft magnetic layer 20 be formed having a film thickness of 10 nm or greater and 300 nm or less.

The second process step (b) of the method of the invention is a process of forming first crystal orientation control layer 31 on soft magnetic layer 20. First crystal orientation control layer 31 is a layer which appropriately controls the crystal orientation, crystal grain diameters, and grain boundary segregation in magnetic recording layer 40 (particularly in granular structure portion 41). First crystal orientation control layer 31 can be formed using a sputtering method to layer a material having the hexagonal close-packed (hcp) crystal structure. For example, NiFeNb, Ru, or an alloy containing Ru can be used. From the standpoint of appropriately controlling the crystal orientation of magnetic recording layer 40, it is particularly desirable that Ru or an alloy containing Ru be used to form first crystal orientation control layer 31. First crystal orientation control layer 31 may be a single layer, or it may have a layered structure of a plurality of different materials. When a layered-structure first crystal orientation control layer 31 is used, it is desirable that the uppermost layer in the layered structure be formed using Ru or an alloy containing Ru.

The third process step (c) of this method of the invention is a process of providing a depression in at least a portion of first crystal orientation control layer 31.

A first mode of this process comprises (c1) a process step of forming a resist layer 60 on the first crystal orientation control layer 31, (c2) a process step of patterning resist layer 60 using a nanoimprinting method, (c3) a process step of using the patterned resist layer 60 to perform etching of first crystal orientation control layer 31, and (c4) a process step of removing resist layer 60.

Figure 1A:
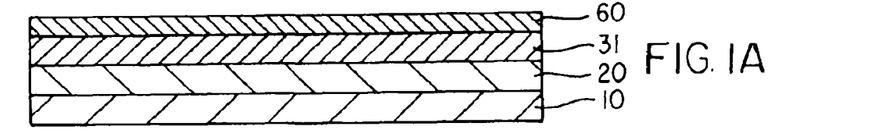
FIG. 1 shows diagrams used to explain an example of a method for manufacturing magnetic recording media of this invention, in which FIGS. 1A to 1F each show a process step.

First, in process (c1), resist layer 60 is formed on first crystal orientation control layer 31, as shown in FIG. 1A. Resist layer 60 can be formed by applying a UV hardening resist material using an application method. As the application method, a spin-coating method, a knife-coating method, a dip coating method, or another arbitrary well-known technique can be used.

Figure 1B:
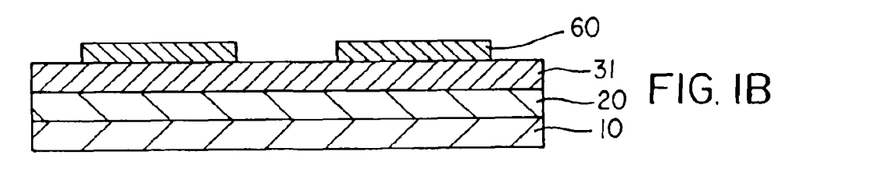

Next, in process (c2), patterning of resist layer 60 is performed, as shown in FIG. 1B. In this invention, patterning is performed such that resist layer 60 remains in positions equivalent to tracks in which magnetic recording is performed (in the case of discrete track media) or equivalent to bits forming single magnetic domains (in the case of patterned media), as well as positions equivalent to portions in which servo signals are recorded, in the magnetic recording media obtained as a result. Specifically, a mold formed from a material such as quartz which is transparent to actinic radiation (UV light or similar) having an effect on resist layer 60, and having depressions in positions at which resist layer 60 is to be left, is pressed against resist layer 60, and in the pressed state is irradiated with actinic radiation to harden resist layer 60, after which the mold is released, to obtain resist layer 60 with the desired pattern.

Figure 1C:
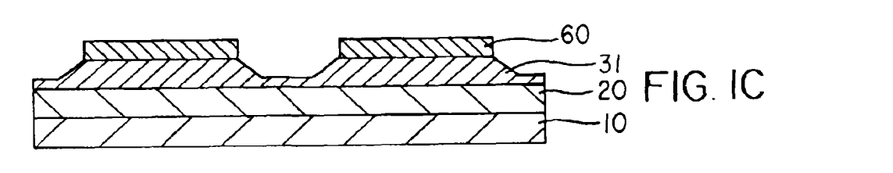

Next, in process (c3), etching of first crystal orientation control layer 31 is performed, using the patterned resist layer 60 as a mask, as shown in FIG. 1C. By means of the etching of this process, in the case of discrete track media, depressions in first crystal orientation control layer 31 are formed in positions equivalent to the track gaps, and to the pattern gaps in the servo signal recording region. Similarly, in the case of patterned media, depressions are formed in first crystal orientation control layer 31 in positions equivalent to bit gaps, and to pattern gaps in the servo signal recording region.

Reactive ion etching (RIE), ion beam etching, or similar can be used as the etching method. It is preferable that this process be performed by reactive ion etching using a gas containing $O_2$ (for example, a gas mixture of $O_2$ and Ar). When performing reactive ion etching using an $O_2$—Ar gas mixture, conditions can be used in which the gas flow rate is 10 to 1000 sccm, the pressure is 0.1 to 20 Pa, the source power is 100 to 1000 W, and the bias power is approximately 100 to 500 W.

The depth of the depressions formed by etching must be deep enough so that magnetic recording layer 40 formed does not have a granular structure. Depressions should normally have a depth of 1 nm or greater, and preferably a depth of 1 nm to 12 nm. In depressions formed by etching, first crystal orientation control layer 31 may be entirely removed; but from the standpoint of preventing the occurrence of corrosion due to etching of soft magnetic layer 20, it is desirable that first crystal orientation control layer 31 remain on the bottom of the depression formed (that is, that the etching be stopped midway in first crystal orientation control layer 31).

The placement interval of depressions formed by etching depends on the recording density sought for the magnetic recording media being manufactured. For example, when forming discrete track media with a recording density of 50 Gbits/square inch, the depressions in the portions to become track gaps are positioned at a pitch of 60 nm. Or, when forming patterned media with a recording density of 1 Tbit/square inch, the depressions in the portions to become bit gaps are placed at a pitch of 25 nm.

Figure 1D:
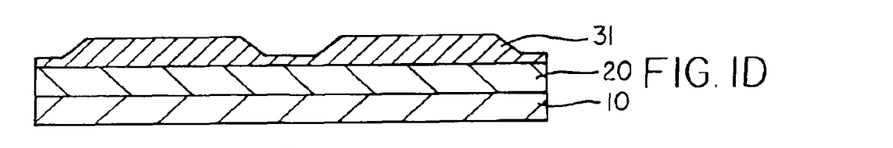

Finally, in process (c4), resist layer 60 used as a mask is removed, exposing the protruding portions of first crystal orientation control layer 31, as shown in FIG. 1D. The protruding portions of first crystal orientation control layer 31 are formed in positions equivalent to the tracks and servo signal recording region of discrete track media, or to the bits and servo signal recording region of patterned media. Removal of resist layer 60 can be performed by $O_2$ ashing, or by cleaning using hydrogen peroxide sulfate (a mixture of sulfuric acid and hydrogen peroxide). In order to minimize reduction of the thickness of first crystal orientation control layer 31 and damage to first crystal orientation control layer 31, it is desirable that removal of resist layer 60 be performed under conditions that are as moderate as possible. For example, when removing resist layer 60 using $O_2$ ashing, conditions of, for example, a gas flow rate of 10 to 1000 sccm, pressure of 0.1 to 10 Pa, and source power of approximately 50 to 300 W can be used.

A second mode of this process comprises a process in which a nanoimprinting method is used, wherein a mold having a prescribed pattern shape is pressed under high pressure against first crystal orientation control layer 31, depressions are formed in first crystal orientation control layer 31, and the structure shown in FIG. 1D is obtained. As the mold, an Ni electrocast mode or an Si mold can be used.

Figure 1E:
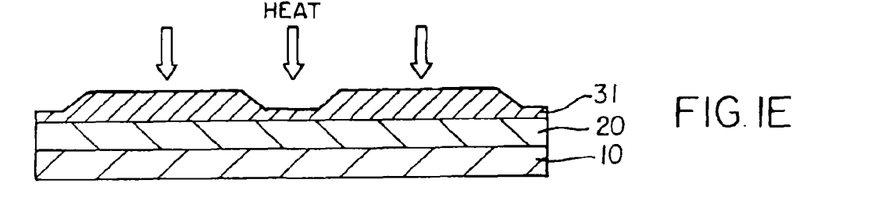

The fourth process step (d) of the method of the invention is a process in which first crystal orientation control layer 31 is heat treated, as shown in FIG. 1E. This process can be performed by heating first crystal orientation control layer 31 to a preset temperature in the range 100 to 230° C., and maintaining the preset temperature for from 1 to 30 minutes. The environment when performing the heat treatment may be air, or else $N_2$ or another inert atmosphere, at normal pressure. Or, heat treatment may be performed in an air or inert atmosphere in a reduced-pressure state. In particular, when the preset temperature is 200° C. or higher, it is desirable that an inert atmosphere or an atmosphere in a reduced-pressure state be used. By performing heat treatment, removal of resist layer 60 (c4) or damage to the protruding portions of first crystal orientation control layer 31 due to pressing under high pressure in process (c) can be compensated.

The optimum value of the film thickness of first crystal orientation control layer 31 depends on the desired crystal structure in the material of magnetic recording layer 40 formed thereupon, such as, for example, the crystal grain sizes in the granular structure and the thickness of the surrounding nonmagnetic grain boundaries. In general, it is desirable that the film thickness of first crystal orientation control layer 31 be in the range of 5 nm or greater and 50 nm or less.

Figure 1F:
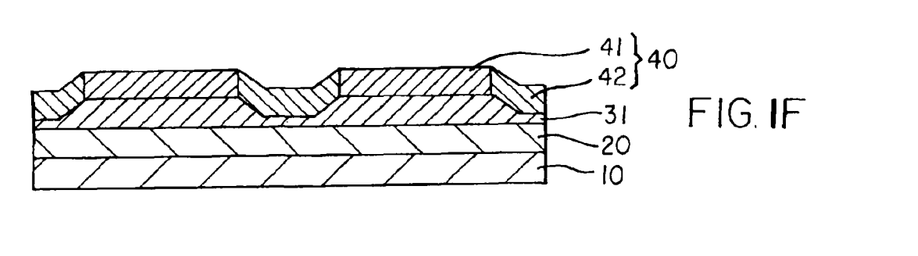

The fifth process step (e) of the method of the invention is a process in which magnetic recording layer 40 is formed on second crystal orientation control layer 32, as shown in FIG. 1F. Magnetic recording layer 40 can be formed by simultaneously sputtering a material forming the ferromagnetic crystal grains and a material forming the nonmagnetic grain boundaries. As the material forming the ferromagnetic crystal grains, a CoCr system alloy can be used. In particular, in order to obtain excellent magnetic characteristics and read/write characteristics, it is desirable that an alloy obtained by adding at least one element selected from among the group of Pt, Ni, Ta, and B to a CoCr alloy be used. Further, in order to form a stable granular structure together with the material forming the ferromagnetic crystal grains, it is desirable that, as the material forming the nonmagnetic grain boundaries, oxides of at least one element selected from among the group Cr, Co, Si, Al, Ti, Ta, Hf, and Zr be used.

Normally it is desirable that the film thickness of the magnetic recording layer 4 be 10 nm or greater and 60 nm or less. By forming a magnetic recording layer 40 with a film thickness in this range, adequate signal characteristics and excellent read/write resolution can be realized for the magnetic recording media.

Magnetic recording layer 40 comprises granular-structure portions 41, formed on the protruding portions of crystal orientation control layer 30, and nongranular-structure portions 42, formed on the depression portions of crystal orientation control layer 30. In granular-structure portions 41, ferromagnetic crystal grains are surrounded by nonmagnetic grain boundaries, and the easy axis of magnetization of the ferromagnetic crystal grains is oriented perpendicularly. Granular-structure portions 41 have normal ferromagnetic characteristics appropriate for perpendicular magnetic recording, and serve as the track and servo signal recording regions in discrete track media, or as the bits and servo signal recording regions in patterned media. On the other hand, nongranular-structure portions 42 have a structure in which ferromagnetic crystal grains and nonmagnetic grain boundaries are intermixed, but the ferromagnetic crystal grains are not surrounded by nonmagnetic grain boundaries. As a result, nongranular-structure portions 42 have soft magnetic characteristics with low permeability. Adjacent granular-structure portions 41 are magnetically separated by intervening nongranular-structure portions 42. By means of this magnetic separation, write bleeding into adjacent tracks in the resulting magnetic recording media can be prevented, and at the same time the formation of zigzag domain walls, the effects of thermal fluctuation, magnetic interactions between magnetic grains, and similar can be reduced.

Further, depressions and protrusions in the surface of the magnetic recording media (formed in process (c)) in this manufacturing method of the invention are small compared with the depressions and protrusions formed in methods of the prior art (for example, removal of the entirety of the magnetic recording layer or soft magnetic layer, or imparting depressions/protrusions to the substrate), so that the planarization process, which had been necessary in methods of the prior art, can be omitted.

A modified example of a method of the invention is shown in FIG. 2. The process steps (a) to (d) of the modified examples (equivalent to FIGS. 2A to 2E) can be performed similarly to the process steps (a) to (d) of the above method (equivalent to FIGS. 1A to 1E).

Figure 2A:
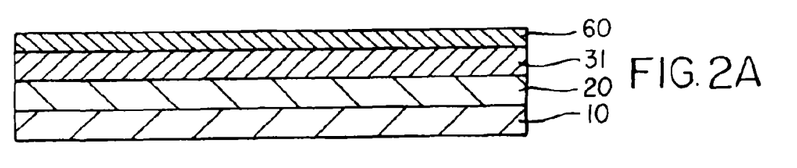
FIG. 2 shows diagrams used to explain another example of a method for manufacturing magnetic recording media of this invention, in which FIGS. 2A to 2G each show a process step.
Figure 2B:
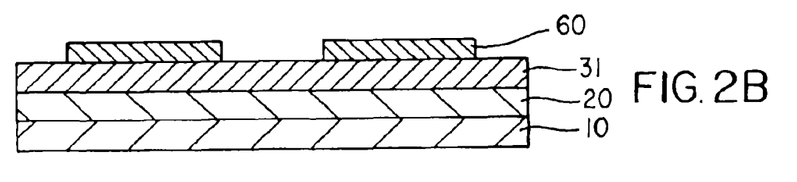
Figure 2C:
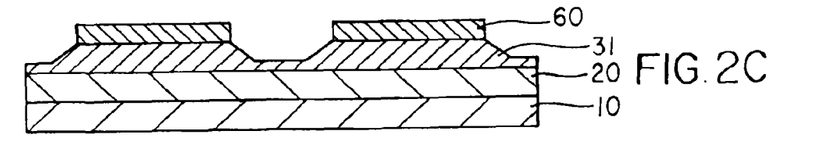
Figure 2D:
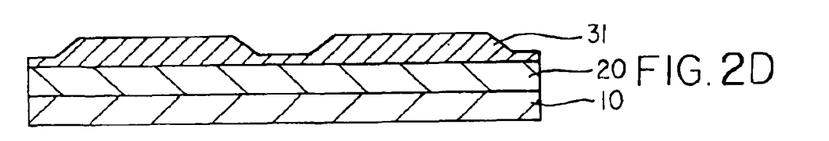
Figure 2E:
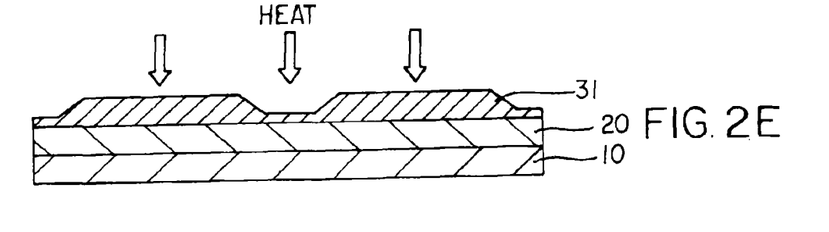
Figure 2F:
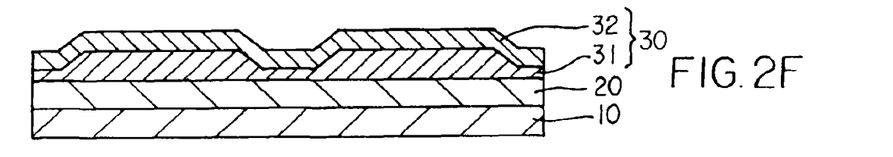

Following process step (d), a process (d2) is performed in which second crystal orientation control layer 32 is formed on the heat-treated first crystal orientation control layer 31, as shown in FIG. 2F. Second crystal orientation control layer 32, similarly to first crystal orientation control layer 31, can be formed using a sputtering method to layer material having a hexagonal close-packed (hcp) crystal structure. Examples of layered material are Ru, and an alloy containing Ru. It is desirable that second crystal orientation control layer 32 be formed from the same material as first crystal orientation control layer 31.

The optimum value of the film thickness of crystal orientation control layer 30, comprising first crystal orientation control layer 31 and second crystal orientation control layer 32, depends on the desired crystal structure in the material of magnetic recording layer 40 formed thereupon, such as, for example, the crystal grain sizes in the granular structure and the thickness of the surrounding nonmagnetic grain boundaries. Generally, it is desirable that the film thickness of the crystal orientation control layer 30 be controlled in the range of 5 nm to 50 nm. Of these, it is desirable that second crystal orientation control layer 32 have a film thickness sufficient, in concert with the heat treatment of process (d), to compensate for damage to protruding portions of first crystal orientation control layer 31 due to removal of resist layer 60 (c4) or to high-pressure pressing by the mold, in process (c), and is sufficient to ensure that magnetic recording layer 40 formed in the depressions of first crystal orientation control layer 31 becomes nongranular structure portions 42. In normal cases, it is desirable that the film thickness of second crystal orientation control layer 32 be in the range of 1 nm to 12 nm.

Figure 2G:
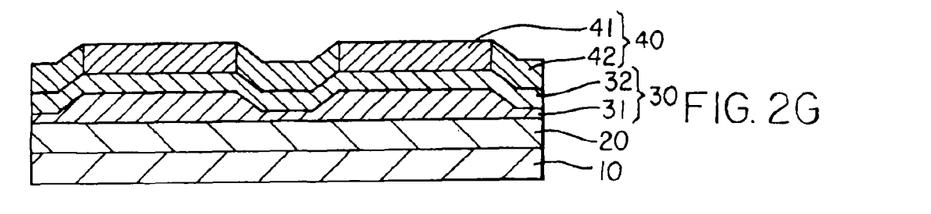

Following process (d2), in process step (e) shown in FIG. 2G, magnetic recording layer 40 is formed similarly to the process step (e) in the above-described method.

A protective layer (not shown) may optionally be formed on magnetic recording layer 40. The protective layer can be formed using any arbitrary material known in the prior art, such as a material the main component of which is carbon. It is desirable that the protective layer have a film thickness of 1 nm or greater and 10 nm or less. By having a film thickness in this range, the occurrence of pinholes and decreases in durability are prevented, while at the same time a distance between the head and magnetic recording layer 40 that is necessary for high-density recording/reproduction (a shorter distance is desirable) can be secured. Further, it is desirable that an optional liquid lubricant layer (not shown) be formed on the protective layer. The liquid lubricant layer can be formed using a material known in the prior art, such as a perfluoro polyether lubricant or similar. As the film thickness of the liquid lubricant layer and other conditions, the conditions used in normal magnetic recording media can be employed without modification.

As a modified example of the magnetic recording media manufacturing method of the invention explained above, a process of packing a nonmagnetic material into the depressions on nongranular-structure portions 42 of magnetic recording layer 40, and a process of planarizing the surface of magnetic recording layer 40 and the packed nonmagnetic material, may further be provided. Or, between process step (d) and process step (e), a process of packing a nonmagnetic material into the depressions of crystal orientation control layer 30, and a process of planarizing the surface of crystal orientation control layer 30 and the packed nonmagnetic material, may be provided. In these modified examples, in compensation for the disadvantages of greater complexity of processes and worsened productivity due to the addition of the nonmagnetic material packing and planarization processes, there is the advantage that the surface of the resulting magnetic recording media is made more planar. These modified examples are effective when, in a magnetic recording apparatus using the magnetic recording media obtained, it is necessary to reduce the head flying height to the extent possible, or when it is necessary to use a small head with poor flying performance. Further, the depressions/protrusions formed in process step (c) of a manufacturing method of the invention are small compared with the depressions/protrusions formed in methods of the prior art, facilitating control during the nonmagnetic material packing and the planarization in these modified examples.

EMBODIMENT

Below, the invention is explained further using specific examples. The following embodiment is no more than an example used to appropriately explain the invention, and the invention is in no way limited thereto. In the following embodiment, manufacture of discrete track media is explained, but it should be understood by a practitioner of the art that a similar method can be used to form patterned media.

Embodiment 1

A sputtering method was used to deposit CoZrNb on substrate 10, which was a chemically reinforced glass substrate (for example, HOYA N-5 glass substrate) with a flat surface, to obtain soft magnetic layer 20 of thickness 200 nm.

A sputtering method was used to deposit, on soft magnetic layer 20, an NiFeNb layer of thickness 3 nm and a Ru layer of thickness 15 nm, to obtain first crystal orientation control layer 31.

A spin-coater was used to apply a UV hardening resist, to form a resist layer on first crystal orientation control layer 31. Then, a quartz mold was prepared, having a depression/protrusion pattern comprising lines and spaces equivalent to a concentric-circle track inverted pattern (that is, with depressions at positions equivalent to tracks and protrusions at positions equivalent to track gaps) at a pitch of 100 nm, and having an island-shape depression/protrusion pattern equivalent to a servo portion inverted pattern. This quartz mold was pressed against resist layer 60, and in this state UV radiation was passed through the quartz mold to cause sufficient hardening of resist layer 60, after which the quartz mold was separated, to pattern resist layer 60. By means of this process, resist layer 60 was obtained having the desired track and servo portion pattern.

RIE was performed using patterned resist layer 60 as a mask with a gas containing $O_2$, to form depressions of depth 10 nm in first crystal orientation control layer 31. At this time, conditions were used in which the gas flow rate was 100 sccm, the pressure was 1 Pa, the source power was 500 W, and the bias power was 250 W.

$O_2$ ashing was performed inside the RIE device using $O_2$ gas at a gas flow rate of 300 sccm and pressure 1 Pa and with a source power of 100 W, to remove resist layer 60 which had been used as a mask.

The layered member with the resist removed was heated to 200° C. in a reduced-pressure environment (pressure 10 Pa) and the temperature of 200° C. was maintained for 1 minute to perform heat treatment. Then, a sputtering method was used to deposit CoCrPt—$SiO_2$, to obtain magnetic recording layer 40 of thickness 30 nm.

A sputtering method was used to deposit carbon and form a protective layer of thickness 5 nm. Finally, a perfluoro polyether was applied using a dipping method to form a liquid lubricant layer of thickness 2 nm, and discrete track media was obtained.

Comparative Example 1

Except for the fact that the source power in $O_2$ ashing was changed to 250 W, and that heat treatment was not performed after $O_2$ ashing, the same procedure as in Embodiment 1 was repeated to obtain discrete track media.

Comparative Example 2

Except for the fact that heat treatment was not performed after $O_2$ ashing, the same procedure as in Embodiment 1 was repeated to obtain discrete track media.

Reference Example 1

The same procedure as used in Embodiment 1 was repeated, except for the fact that after forming first crystal orientation control layer 31, without performing patterning, magnetic recording layer 40, protective layer, and liquid lubricant layer were immediately formed, to obtain perpendicular magnetic recording media. The purpose of the reference example was to evaluate the characteristics of a magnetic recording layer not affected by patterning of the crystal orientation control layer.

Evaluation

Through Kerr effect measurements, the magnetic characteristics of the magnetic recording layer in the media obtained in Embodiment 1, Comparative Examples 1 and 2, and Reference Example 1 were evaluated. Results appear in FIG. 3. In FIG. 3, the magnetic field H is shown in units relative to the coercive force Hc of the magnetic recording layer of the media in Reference Example 1, and the magnetization M is shown in units relative to the residual magnetization Ms of the magnetic recording layer of the media in Reference Example 1.

Figure 3A:
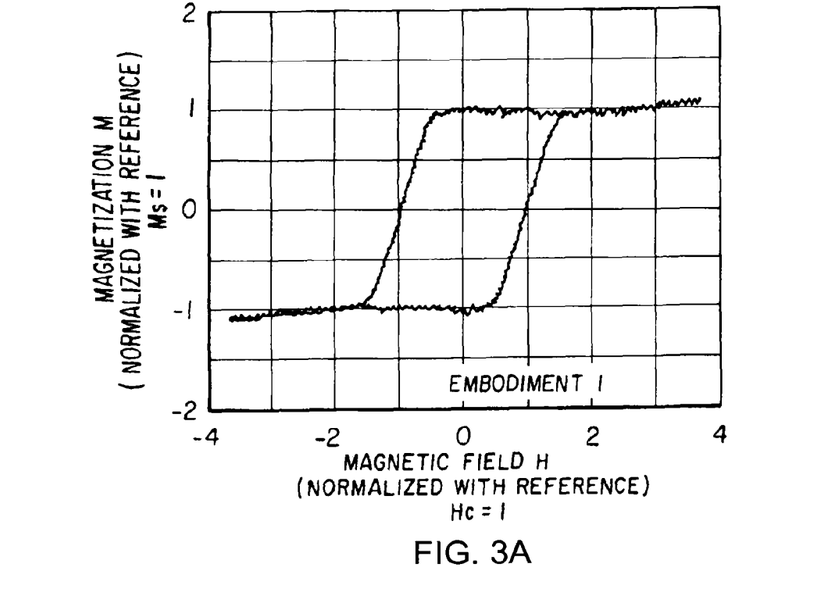
FIG. 3A shows the magnetic characteristic of the magnetic recording layer in Embodiment 1.
Figure 3B:
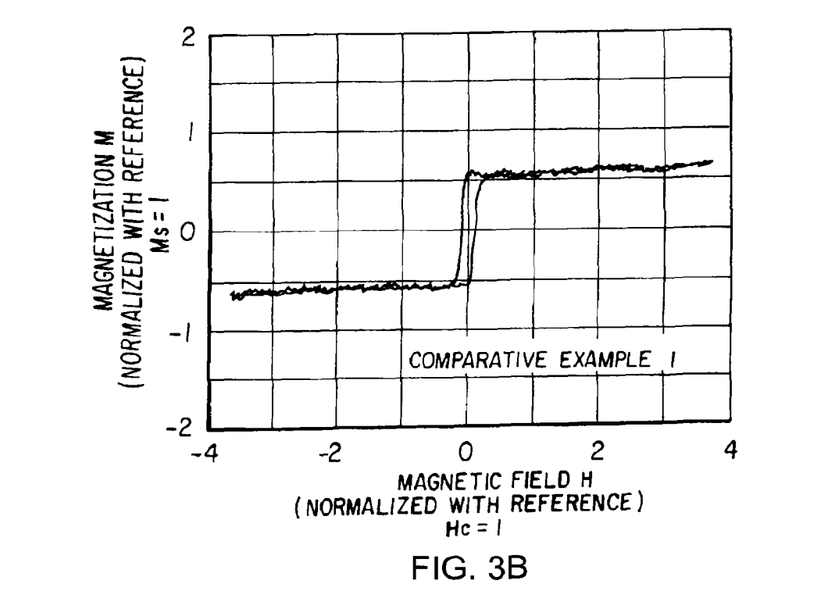
FIG. 3B shows the magnetic characteristic of the magnetic recording layer in Comparative Example 1.
Figure 3C:
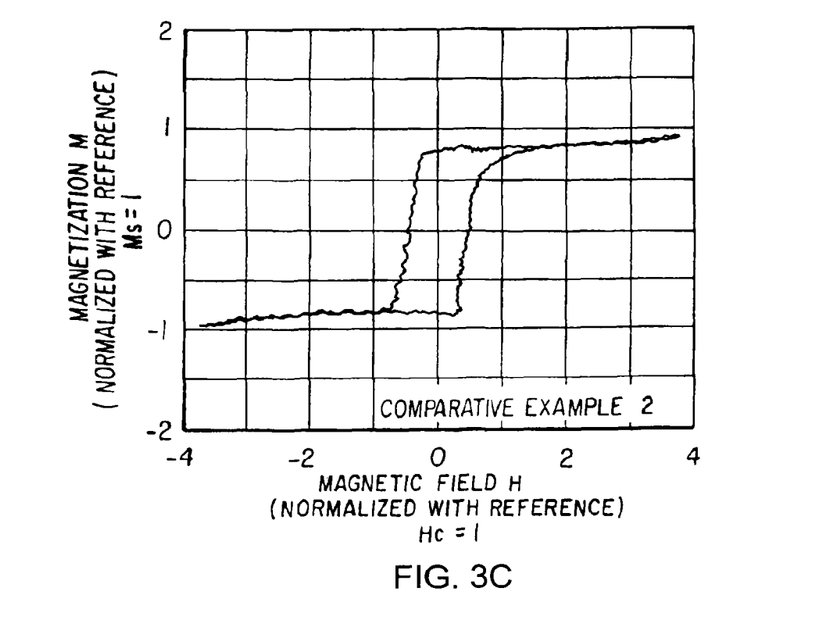
FIG. 3C shows the magnetic characteristic of the magnetic recording layer in Comparative Example 2.
Figure 3D:
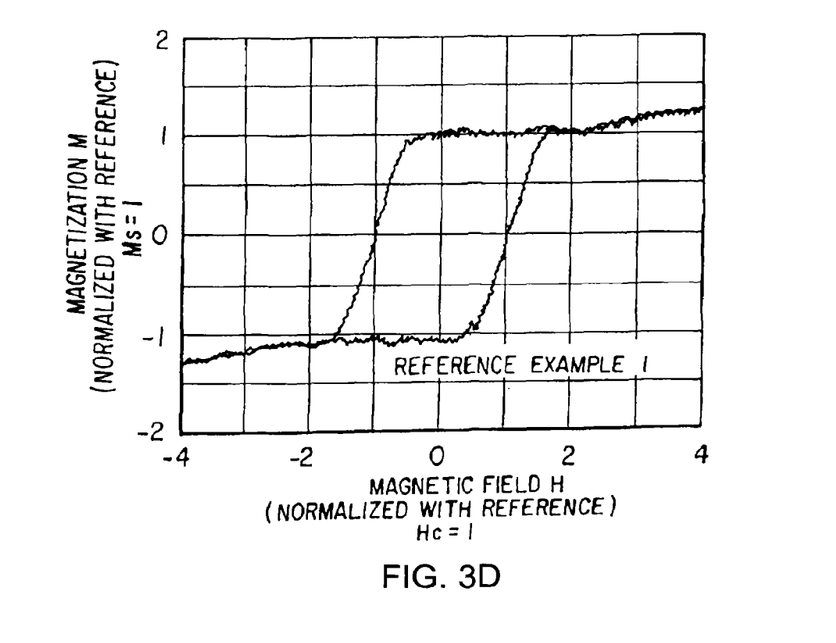
FIG. 3D shows the magnetic characteristic of the magnetic recording layer in Reference Example 1.

The Hc and Ms of magnetic recording layer 40 of the discrete track media of Comparative Example 1, shown in FIG. 3B, are both smaller than the Hc and Ms of the magnetic recording layer of the media in Reference Example 1, shown in FIG. 3D. This is attributed to the fact that, because the source power during $O_2$ ashing was high and in addition heat treatment was not performed, magnetic recording layer 40 was layered directly onto the surface of first crystal orientation control layer 31, which had undergone a reduction of thickness or received damage during $O_2$ ashing, and consequently, it is thought, the granular structure was not formed adequately, nor was orientation control sufficient.

Magnetic recording layer 40 of the discrete track media of Comparative Example 2 had a larger Hc and Ms, shown in FIG. 3C, than those of magnetic recording layer 40 in Comparative Example 1. However, the Hc and Ms in Comparative Example 2 were still smaller than the Hc and Ms of the magnetic recording layer 40 in Reference Example 1. This indicates that, although by lowering the source power during $O_2$ ashing the reduction in film thickness and damage to first crystal orientation control layer 31 could be reduced, the advantageous result thereof was inadequate.

In contrast with the results for the above Comparative Examples, magnetic recording layer 40 of the discrete track media of Embodiment 1, manufactured according to the method of this invention shown in FIG. 1, exhibited an Hc and Ms substantially equal to those of the magnetic recording layer of the media of Reference Example 1. As a result, it was found that by lowering the $O_2$ ashing source power as well as performing heat treatment, the reduction in thickness and damage to first crystal orientation control layer 31 due to $O_2$ ashing could be adequately compensated.

The discrete track media manufactured in Embodiment 1 was installed in a commercial magnetic recording apparatus comprising a perpendicular magnetic recording head, and the head flying performance was confirmed. As a result, there was no contact between head and media and no occurrence of head resonance or similar effects, and stable head flying performance was confirmed.

The read/write characteristics of the discrete track media manufactured in Embodiment 1, Comparative Example 1, and Comparative Example 2 were evaluated. Signals with a linear recording density in the track direction of 254 kTPI were recorded in both the track portions (equivalent to granular-structure portions 41) and in the track gaps (equivalent to nongranular-structure portions 42), and the recorded signals were then reproduced. A clear difference between signal characteristics of the track portions and track gaps was obtained for the discrete track media of Embodiment 1, and magnetic separation of adjacent tracks could be confirmed. From these results, it is thought that by making the pattern formed in first crystal orientation control layer 31 finer (that is, the pattern formed in magnetic recording layer 40), high recording densities can be accommodated. On the other hand, in the cases of the discrete track media manufactured in Comparative Example 1 and Comparative Example 2, a difference in the signal characteristics for the track portions and for the track gaps could not be obtained.

Thus, a method for manufacturing magnetic recording media and the media formed by the method have been described according to the present invention. Many modifications and variations may be made to the techniques and structures described and illustrated herein without departing from the spirit and scope of the invention. Accordingly, it should be understood that the media, methods and apparatus described herein are illustrative only and are not limiting upon the scope of the invention.

This application is based on and claims priority to Japanese Patent Application JP 2007-292346, filed on Nov. 9, 2007. The disclosure of the priority application in its entirety, including the drawings, claims, and the specification thereof, is incorporated herein by reference.

What is claimed is:

1. A magnetic recording medium, comprising a soft magnetic layer, a first crystal orientation control layer, and a magnetic recording layer, formed in this order on a nonmagnetic substrate,
    wherein first depressions are located in at least respective portions of the first crystal orientation control layer,
    wherein the magnetic recording medium further comprises second depressions respectively corresponding to the first depressions, the second depressions located in at least respective portions of the magnetic recording layer,
    wherein the first crystal orientation control layer comprises first protrusions as well as the first depressions,
    wherein the magnetic recording layer comprises second protrusions corresponding to the first protrusions,
    wherein the second depressions comprise a nongranular structure, and
    wherein the second protrusions comprise a granular structure.

2. The magnetic recording medium according to claim 1, wherein each of the first depressions in the first crystal orientation control layer has a depth of 1 nm to 12 nm.

3. The magnetic recording medium of claim 1, wherein the first crystal orientation control layer contacts the magnetic recording layer.

4. The magnetic recording medium of claim 1, wherein the first depressions are located at positions corresponding to track gaps or bit gaps with a placement pitch related to a recording density of the magnetic recording medium.

5. The magnetic recording medium of claim 4, wherein the first depressions are formed in positions equivalent to bit gaps.

6. The magnetic recording medium of claim 4, wherein the first depressions are formed in positions equivalent to track gaps.

7. A magnetic recording medium, comprising a soft magnetic layer, a first crystal orientation control layer, and a magnetic recording layer, formed in this order on a nonmagnetic substrate,
    wherein first depressions are located in at least respective portions of the first crystal orientation control layer, wherein the magnetic recording medium further comprises second depressions respectively corresponding to the first depressions, the second depressions located in at least respective portions of the magnetic recording layer, wherein the magnetic recording medium further comprises a second crystal orientation control layer formed on the first crystal orientation control layer, the second crystal orientation control layer comprising third depressions corresponding to the first depressions and the second depressions, wherein the first crystal orientation control layer, the second crystal orientation control layer, and the magnetic recording layer comprise corresponding protrusions, wherein the second depressions comprise a nongranular structure, and wherein the protrusions of the magnetic recording layer comprise a granular structure.

8. The magnetic recording medium according to claim 7, wherein each of the first depressions in the first crystal orientation control layer has a depth of 1 nm to 12 nm.

9. The magnetic recording medium of claim 7, wherein the second crystal orientation control layer contacts the magnetic recording layer.

10. The magnetic recording medium of claim 7, wherein the first depressions are located at positions corresponding to track gaps or bit gaps with a placement pitch related to a recording density of the magnetic recording medium.

11. The magnetic recording medium of claim 10, wherein the first depressions are formed in positions equivalent to bit gaps.

12. The magnetic recording medium of claim 10, wherein the first depressions are formed in positions equivalent to track gaps.

* * * * *